Nov. 23, 1937.  H. A. KIESELBACH  2,099,740

THERMAL INSULATION

Filed Feb. 23, 1935

INVENTOR.
Henry A. Kieselbach.
BY D. N. Halstead.
ATTORNEY.

Patented Nov. 23, 1937

2,099,740

UNITED STATES PATENT OFFICE 2,099,740

THERMAL INSULATION

Henry A. Kieselbach, Montclair, N. J., assignor to Johns-Manville Corporation, New York, N. Y., a corporation of New York Application February 23, 1935, Serial No. 7,775

3 Claims. (Cl. 116—114)

This invention relates to means for indicating the approximate temperature of an object provided with an outer protective layer of thermal insulation and rendered thereby inaccessible to observation by touch.

It is frequently important to know what portion of an insulated object is heated or the approximate temperature of the object at various positions inside the insulation. Thus, an observer may wish to note the condition as to temperature at various levels within a tank of heated oil or in a domestic hot water tank. In the latter case, for instance, it is frequently desired to know the approximate amount of heated water in the tank, in order to prevent waste of fuel by heating more water than necessary for a given purpose. When such a tank is thoroughly insulated by an outer covering, it is not feasible to observe by touch or by any other simple means the supply of hot water in the tank.

Previous devices that have been proposed for the purpose of indicating the level or approximate temperature of heated water or the like in an insulated tank have been complicated, subject to considerable lag in time of showing a temperature condition prevailing in the tank, or adapted to permit substantial loss of heat through the devices themselves.

The present invention comprises means for overcoming the stated disadvantages of previously used indicators, these means being described below and illustrated in the attached drawing in which—

In the various figures like reference characters denote like parts.

Figure 1:
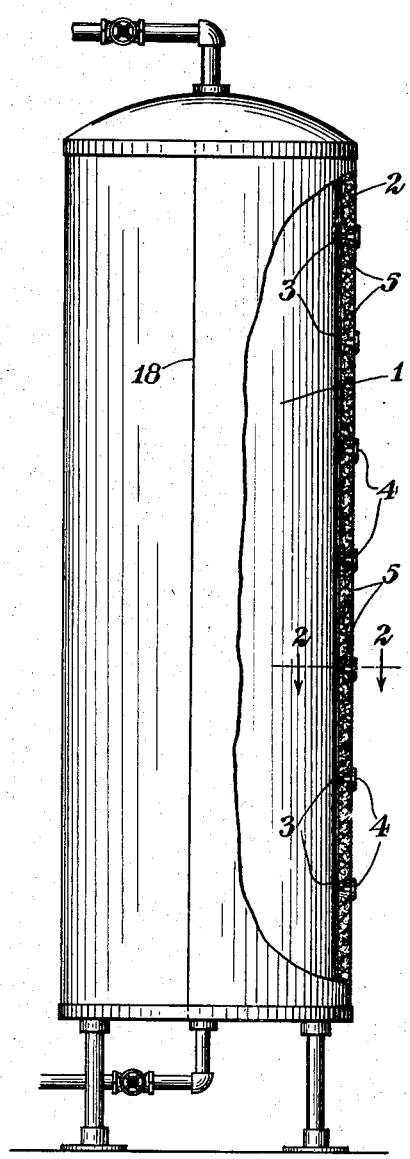
Fig. 1 shows a side view of a preferred embodiment of the invention, partly broken away for clearness of illustration.

There are shown an object 1 such as a vertically arranged cylindrical domestic hot water tank and an outer protective layer of insulation 2 placed therearound. The insulation may be of any suitable type, of which a plurality of composited sheets of asbestos paper defining air spaces therebetween is satisfactory.

The temperature indicators are disposed at intervals along the side of the heated object, from top to bottom, and contain an element 3 contacting with the surface of the heated object and being preferably constituted of a thin flexible metal disc adapted to conform closely with the curved exterior surface of the object 1, an outer element such as a disc 4 of metal, and a union member 5, preferably also of metal, extending through the insulation and connecting the said two elements together.

The elements 3 and 4 and the union member 5 are constituted of material of high specific thermal conductance of the order of that of metals, that is, of the heavy metals such as iron, copper, brass or the like, as distinguished from the lower conductivity of less dense material such as glass.

Conformance of the element 3 to the surface of the object 1 and the close contact therewith adapts the element 3 to receive heat readily and attain approximately the temperature of the surface of the object 1. The high specific thermal conductance of the several elements of the indicating device adapts them to conduct the heat to the exposed element 4 and, also, adapts this latter element to indicate to the touch the approximate temperature with greater certainty than would be the case if the element 4 were of such relatively poor conducting material as paper or glass.

Also, the union member 5 is of diameter that is very small in comparison with the diameter of the heat-gathering element 3. The smallness of diameter of the member 5 and its consequent relatively small surface minimize loss of heat laterally from the said member. The area of cross section of the union member 5 is consequently very small in proportion to the area of the element 3 which contacts with the object 1 and, also, in proportion to the area of the exposed element 4.

As illustrated, the heat indicating means may have roughly the shape and form of rivets, such as those of copper, which is a suitable material of construction for the said means.

Figure 2:
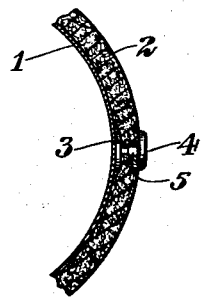
Fig. 2 shows a sectional view on an enlarged scale, on line 2—2 of Fig. 1.

Preferably, the rivet-like indicators are made in two parts, adapted to be inserted through the insulation from opposite sides and to give snug contact at the place of union, so that flow of heat between the two parts will be satisfactory. Thus, the union member may contain male and female parts, as illustrated in Fig. 2, contacting over substantial areas, so that heat flow from one part to the other is facilitated.

Figure 3:
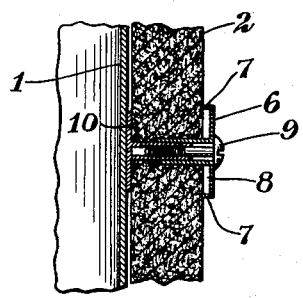
Fig. 3 shows a sectional view, also on an enlarged scale, of a modified form of temperature indicator.

In the modification shown in Fig. 3, the outer element 6 is adapted to minimize loss of heat therefrom to the outside of the insulation 1. Thus, the element is of dished shape and contacts with the insulation 2 only at the relatively thin edge portions 7. There is thus defined a space 8 between the outside of the insulation and the major or main portion of the element 6.

Fig. 3 shows also a modified form of union member, including a screw connection between the two portions joined, respectively, to the inner and outer elements of the temperature-indicating device. This screw connection provides large surfaces of contact favoring the flow of heat through the union member. To facilitate the screwing together of these members, the portion 9 is suitably made independently turnable with respect to the exterior element 6, so that the element 6, preferably saddle shaped to fit the curvature of the insulation, may be brought into conforming contact therewith and the portion 9 of the union member then turned by a suitable tool, to cause engagement of the thread with the portion 10 of the union member.

Figure 4:
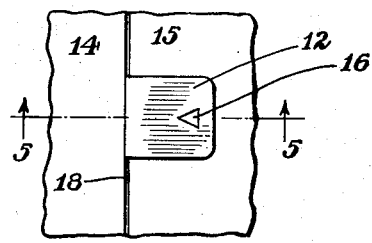
Fig. 4 shows a side view of a portion of an insulation assembly having another modified form of temperature indicator.
Figure 5:
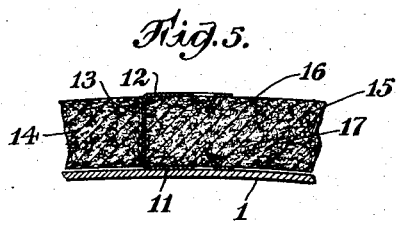
Fig. 5 shows a sectional view on line 5—5 of Fig. 4.

In the modification shown in Figs. 4 and 5, a heat-gathering element 11 is in contact with the object insulated. A similar element 12 is exposed on the outside of the insulation and the union member 13 extends through the joint 18 between adjacent portions 14 and 15 of the insulation. If it is desired to avoid accidental displacement of the temperature indicator along the joint, the elements 11 and 12 may be provided with means 16 and 17, such as depressed points penetrating the insulation, to establish the position of the temperature indicator with reference thereto. They are of high specific thermal conductance as described.

The temperature indicator, parts 11, 12, and 13, are suitably constructed of thin sheet metal, say number 28 gauge brass or the like.

The modification shown in Figs. 4 and 5 has special merit in that there is no through-penetration of the insulating material by any portion of the temperature indicator. The union member of this form of indicator lies in the joint.

With a tank provided with insulation containing the tangible temperature-indicating devices that are readily accessible, for being touched by the finger of an observer, as described, an observer may touch the various buttons or elements 4 or 12, arranged along the tank, and thus learn the approximate amount or temperature of heated liquid within the tank. At the same time, the small area of cross section of material, through which heat may flow through the indicating means, minimizes loss of heat, the passage of which from the tank the insulation is intended to prevent. The indicating devices are very simple and relatively inexpensive. Finally, the indicating means, being of small mass and not requiring change of state, with attendant absorption of latent heat, indicate promptly changes of temperature of the object 1.

It will be understood that the details given are for the purpose of illustration, not restriction, and that variations therefrom may be made within the scope of the appended claims.

What I claim is:

1. An assembly comprising a heated tank to be insulated, a layer of thermal insulation disposed therearound and means for indicating by finger touch the approximate temperature of the tank, the said means comprising an element in contact with the tank, an element exposed on the outside of the insulation and constituting a readily accessible tangible temperature indicator, and a union member, of area of cross section very small in proportion to the area of either of the said two elements, connecting the said elements and the said elements and union member being each of high specific thermal conductance of the order of that of metals.

2. An assembly as described in claim 1, the element in contact with the said tank being flexible and conforming approximately to the exterior surface of the tank.

3. An assembly as described in claim 1, the said union member being divided into two portions fitting snugly together over a substantial area thereof and each of the said portions being integral with one of the said elements.

HENRY A. KIESELBACH.